United States Patent

Kuster

[11] Patent Number: 5,923,172
[45] Date of Patent: Jul. 13, 1999

[54] PENNING TYPE GAUGE HEAD WITH IGNITION AID

[75] Inventor: Gerhard Kuster, Cologne, Germany

[73] Assignee: Leybold Aktiengesellschaft, Germany

[21] Appl. No.: 08/849,506

[22] PCT Filed: Sep. 9, 1995

[86] PCT No.: PCT/EP95/03553

§ 371 Date: Jun. 10, 1997

§ 102(e) Date: Jun. 10, 1997

[87] PCT Pub. No.: WO96/19720

PCT Pub. Date: Jun. 27, 1996

[30] Foreign Application Priority Data

Dec. 22, 1994 [DE] Germany ............... 44 45 828

[51] Int. Cl.$^6$ .............. G01L 21/30; G01N 27/62
[52] U.S. Cl. .............. 324/463; 324/459; 250/299; 250/382
[58] Field of Search ............... 324/459, 460, 324/463; 250/281, 298, 299, 374, 382, 389

[56] References Cited

U.S. PATENT DOCUMENTS

| 2,643,342 | 6/1953 | Simpson | 250/289 |
| 2,758,232 | 8/1956 | Fox | 313/7 |
| 4,847,564 | 7/1989 | Limp | 324/460 |
| 5,568,053 | 10/1996 | Drubetsky et al. | 324/463 |

FOREIGN PATENT DOCUMENTS

| 0 271 769 | 6/1988 | European Pat. Off. . |
| 278423 | 4/1963 | Germany . |
| 30 47 744 | 7/1982 | Germany . |
| 2256310 | 12/1992 | United Kingdom . |

*Primary Examiner*—Glenn W. Brown
*Attorney, Agent, or Firm*—Wall Marjama Bilinski & Burr

[57] ABSTRACT

A penning type gauge head with an electrode system comprising an anode and a cathode disposed in the magnetic field of a permanent magnet, including an ignition aid for the electrode system. In order to provide rapid and reliable ignition, the ignition aid consists of a least one metal strip attached on the anode, and the free end of the ignition aid extends in the direction toward the cathode.

9 Claims, 1 Drawing Sheet

PENNING TYPE GAUGE HEAD WITH IGNITION AID

BACKGROUND OF THE INVENTION

The invention relates to a Penning type gauge head with an electrode system comprising an anode and a cathode disposed in the magnetic field of a permanent magnet, as well as with an ignition aid for the electrode system.

Penning type gauge heads of this type are installed in ionization vacuum gauges. They comprise two unheated electrodes (cathode and anode) between which, by means of a DC voltage of the order of magnitude of 2 kV, a cold discharge is ignited and maintained. With the aid of a magnetic field the path of the electrons is extended so that their impact rates with gas molecules is sufficiently large in order to form the required number of charge carriers for maintaining the discharge even at very low pressures. The positive and the negative charge carriers migrate to the corresponding electrodes and form the pressure-dependent discharge current which is displayed on a measuring scale. Of disadvantage in vacuum gauges of this type is that the discharge cannot always be ignited.

From DE-OS 30 47 744 a gauge head of the above described type is known. To attain a reliable ignition it is suggested to provide, apart from the measuring system comprising unheated electrodes, a glow cathode in addition. This measure is expensive since the supply of a sufficiently large current to the glow cathode is required. An additional current supply device as well as a separate current lead-in are required.

From EU-A-271 769 a gauge head of the type relevant here is known, which, apart from the measuring system (main measuring system), comprises a further Penning system with cathode and anode (ignition system). Its dimensions are significantly smaller than the dimensions of the main system. The production of an ignition system of this type is also expensive. Moreover, tests have found that the ignition of the measuring system is not always ensured. The gauge head known from EU-A-271 769 was therefore never introduced on the market.

SUMMARY OF THE INVENTION

The present invention is based on the objective of equipping a gauge head of the above cited type with a reliable ignition aid of simple structure.

According to the invention, this objective is accomplished by attaching at least one metal strip on the anode, whose free end extends in the direction toward the cathode. Due to the high electric field strength in the region of the free end of the metal strip, gas ions are detached which impinge on the cathode and generate their secondary electrons. These cause a rapid and reliable ignition of the electrode system.

A preferred embodiment of the present invention has been found by the selection of the longitudinal direction of the metal strip such that it is not parallel to the magnetic lines but rather intersects the magnetic lines. The ignition could be further increased significantly through this measure.

Further advantages and details of the invention will be explained in further detail in conjunction with an embodiment example depicted in FIGS. 1 and 2.

DETAILED DESCRIPTION OF THE INVENTION

Figure 1:
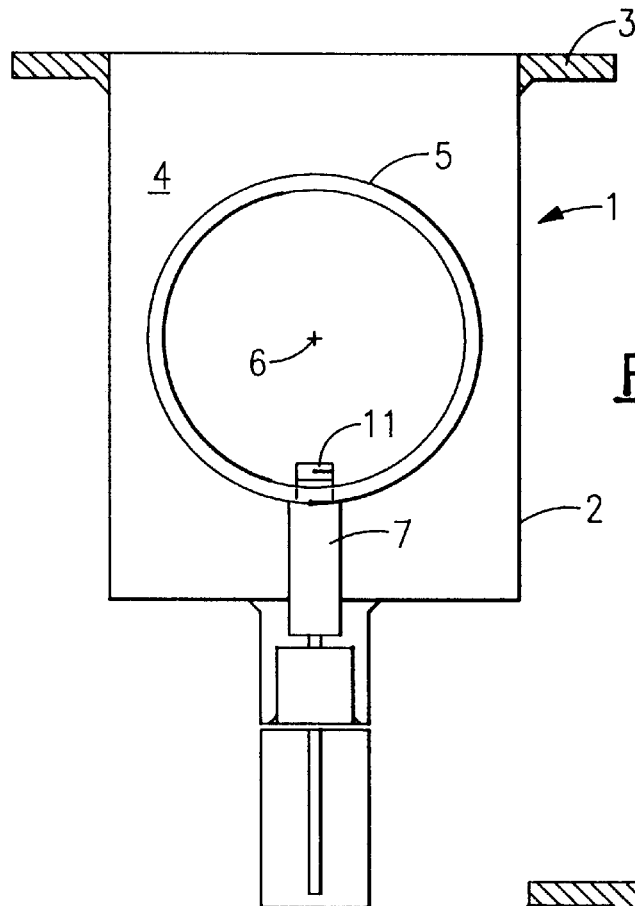
Figure 2:
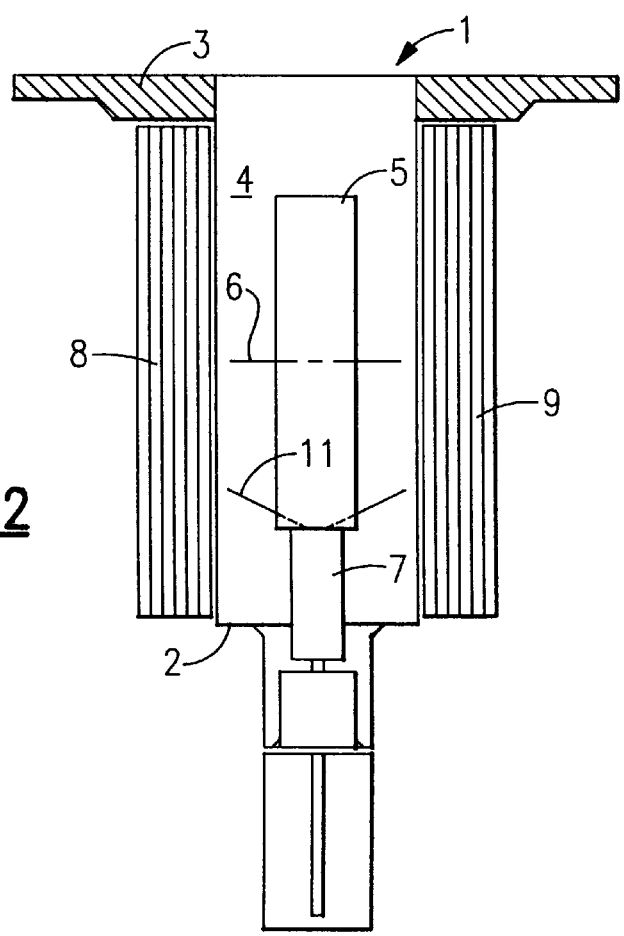

The Penning type gauge head 1 shown schematically in FIGS. 1 and 2 comprises a vacuum-tight housing 2 which simultaneously forms the cathode.

The housing 2 is equipped with a flange 3 with which the gauge head is connected to a receptacle in which the pressure is to be measured and/or monitored.

Within the volume 4 formed by the housing, respectively the cathode, 2 is disposed the annular anode 5 whose axis is denoted by 6. With the aid of the anode voltage feed 7 the anode 5 is mounted in the electrode volume 4. The anode voltage feed is at a positive high-voltage potential (approximately 2 kV). During the operation of the gauge head the discharge is maintained between the anode 5 and the grounded housing 2.

Anode 5 and cathode, respectively housing, 2 are disposed in a magnetic field generated by magnets 8 and 9. One north pole and one south pole each are facing the housing 2 so that the magnetic lines of the magnetic field extend approximately parallel to the anode axis 6.

The ignition aid consists of at least one metal strip 11 which is attached centrally in the region of the anode voltage feed 7 on anode ring 5. The free ends of the ignition aid project laterally from the openings of the anode ring 5. The free ends extends up to the proximity of the cathode, respectively housing, 2. The high electric field strength at this site detaches gas ions from the ends of the metal sheet. By impinging these ions onto the housing wall secondary electrons are generated. Through these electrons the fast and reliable ignition of the Penning type gauge head is possible even at low pressures.

The sheet metal strip usefully comprises a 0.1 mm thick weakly magnetic material. The distance from the housing wall is 0.5 to 1.0 mm at a diameter of the ring anode 5 of approximately 50 mm. It is understood that it is also possible that the ignition aid comprises two separate sheet metal strips which are each attached with their one end at the anode ring 5. But one metal strip of this type alone is sufficient as ignition aid.

In order to achieve that the metal strips 11 forming the ignition aid do not extend parallel to the magnetic lines which conventionally are parallel to the anode ring axis 6, the free ends of the sheet metal strip(s) 11 are bent for example in the direction toward the ring axis 6 after they are attached on the anode ring 5. An angle of approximately 20° between metal strip 11 and ring axis 6 was found to be useful.

I claim:

1. A penning type gauge head with an electrode system comprising an anode and a cathode disposed in the magnetic field of a permanent magnet, further including an ignition aid for the electrode system, wherein said ignition aid comprises at least one metal strip attached on the anode with the free end of said strip extending in the direction toward the cathode.

2. A gauge head according to claim 1 wherein the metal strips comprise a weakly magnetic material.

3. A gauge head according to claim 1 wherein a ring forms the anode, a housing which encompasses the ring forms the cathode, and whereby the metal strip is attached in the region of the anode voltage feed on the anode ring.

4. A gauge head according to claim 3 wherein two metal strips project laterally from the openings of the anode ring.

5. A gauge head according to claim 3 wherein a metal strip is attached centrally on the anode ring, and that its ends project from the openings of the anode ring.

6. A gauge head according to claim 5 wherein said ends extend to the proximity of said cathode.

7. A gauge head according to claim 3 wherein the longitudinal directions of the metal strips are selected such that the metal strips intersect the magnetic field lines.

8. A gauge head according to claim 7 wherein the angle between the longitudinal direction of the metal strips and the magnetic field lines is about 20°.

9. A gauge head according to claim 8 where said metal strips are bent toward said ring.

* * * * *